June 23, 1953
J. L. WATTS
2,642,684
PLANT IDENTIFICATION TAG AND METHOD OF MAKING AND APPLYING SAME
Filed May 16, 1951
2 Sheets-Sheet 1
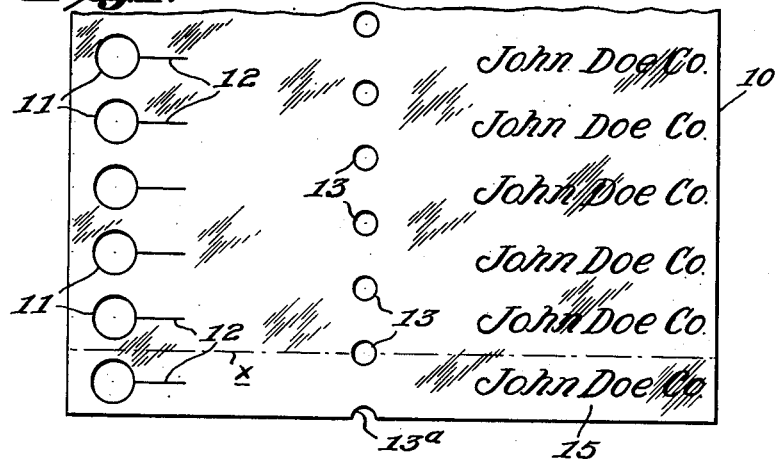
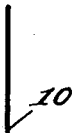
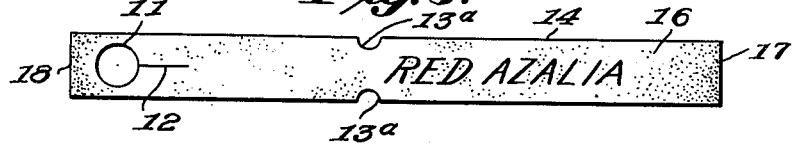
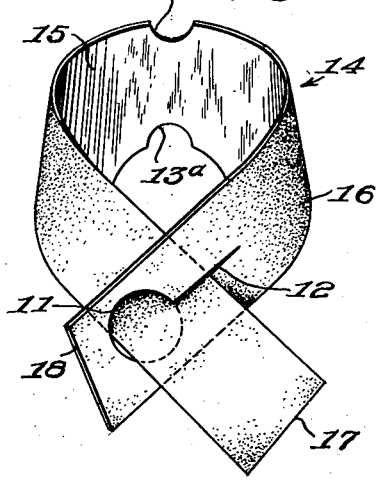
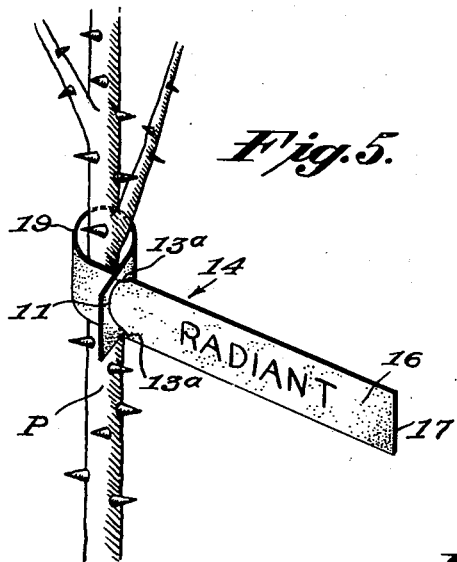
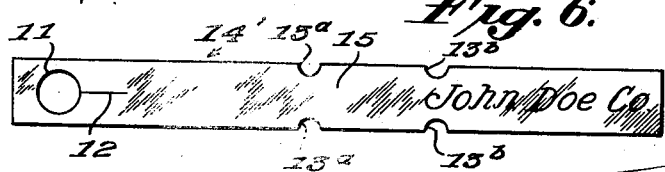
Inventor:
John Langdon Watts.
Attorney.

June 23, 1953  J. L. WATTS  2,642,684
PLANT IDENTIFICATION TAG AND METHOD
OF MAKING AND APPLYING SAME
Filed May 16, 1951  2 Sheets-Sheet 2
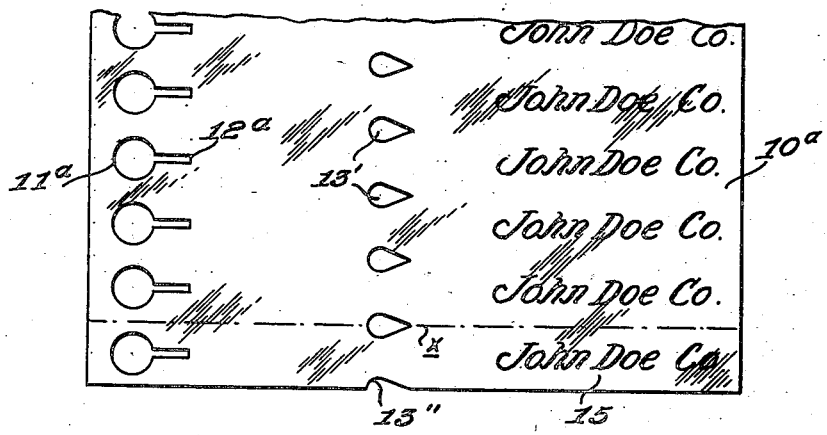
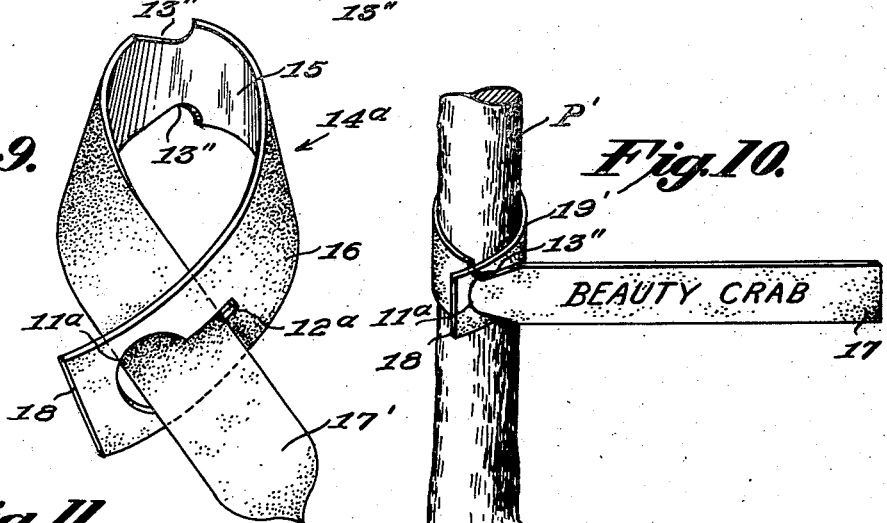
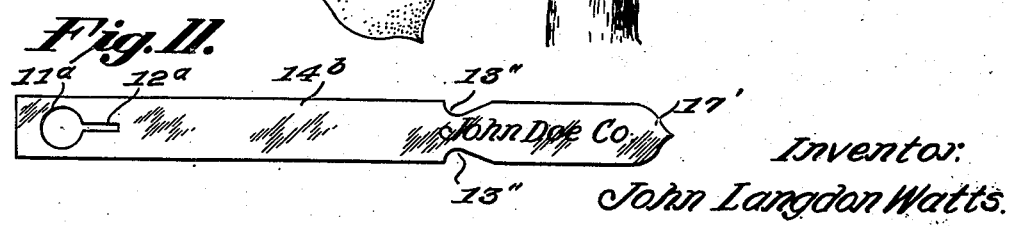
Inventor:
John Langdon Watts
Attorney

UNITED STATES PATENT OFFICE 2,642,684

PLANT IDENTIFICATION TAG AND METHOD OF MAKING AND APPLYING SAME

John Langdon Watts, Daytona Beach, Fla.

Application May 16, 1951, Serial No. 226,692

2 Claims. (Cl. 40—21)

This invention relates to strip type self-locking and releasing identification tag and method of making and applying the same.

The invention is more particularly concerned with plant identification markers and tags of one-piece integral structure which are so constructed and arranged that they may be made in multiple sheet form and which may be readily separable from the sheet in the operation of completing same by cutting along parallel lines. The body portion of each tag so separated from the sheet is thereafter capable of being looped about the stems or stalk of a plant and automatically secured in such looped position by the integral construction of the tag body, in the absence of any extraneous fastening means. The construction of each tag which is responsible for the automatic locking of the looped portions thereof about a stem or twig, also functions to automatically loosen and release the tag as the encompassed stem or twig outgrows the loop. In other words as the diameter of the stem or twig outgrows the dimension of the looped tag the tag will automatically loosen so as not to bind or choke the plant.

In view of the foregoing, a general object of the invention is to provide a plant or other identification tag in the form of an elongated relatively narrow and flat relatively stiff strip of firm but flexible sheet material which is self locking and supporting. The tag strip of this invention is formed adjacent one end thereof with an aperture of a size and shape for receiving the other end body portion thereof which is threaded therethrough in the provision of a loop for encirclement of a stem and a projecting tag portion.

A further object of the invention is to provide a self-locking and releasing tag including an elongated relatively narrow body portion and wherein a circularly walled aperture is provided in the body portion adjacent one end thereof and wherein the body portion is provided with laterally aligned notches intermediate its ends for interlocking engagement with the wall of said aperture upon threading the other end of the body portion therethrough.

A still further and more specific object of the invention is to provide a plant identification tag of elongated strip form and wherein the strip is formed of thermoplastic sheet material and with one face thereof having a gloss printing protected finish and the opposite face having a rough finish, generally referred to as an "erasable" surface.

Another object of the invention resides in the provision of a tag forming and carrying sheet which may be preformed and printed as desired and from which individual strip tags may be severed as required along parallel lines, thus providing reusable strip tags which are inexpensive to produce and simple and reliable in operation.

Still another object of the invention is to provide a novel method for expeditiously forming plant or other strip type identification tags of the character referred to and having the characteristic features recited herein.

Other objects and advantages of the invention will become apparent in the course of the following detailed description, taken in connection with the accompanying drawings, wherein:

Fig. 1 is a plan view of a fragment of the glossy printed side of a sheet of plastic or other similar relatively stiff and resilient material, preformed, for the successive cutting of complete, self-locking and releasing plant identification tags therefrom by merely severing the sheet along parallel lines;

Fig. 2 is an edge view of the sheet shown in Fig. 1;

Fig. 3 is a plan view of one of the tags showing the reverse or erasable side thereof;

Fig. 4 is a perspective view on an enlarged scale showing one of the tag sections in the operation of providing a plant stem receiving loop and just prior to bringing the body portions at one end thereof into automatic interlocked relation with the other coacting body potrions;

Fig. 5 is a perspective view showing one of the looped and interlocked tags as it would appear when secured about the stem of a plant, such as a rose bush;

Fig. 6 is a face plan view of one of the tags in accordance with a modified structural embodiment thereof;

Fig. 7 is a plan view similar to Fig. 1, but illustrating a further modified embodiment of the invention;

Fig. 8 is a plan view corresponding to Fig. 3, and showing one of the tags when cut from the sheet of Fig. 7 and from the reverse or erasable side;

Fig. 9 is a perspective view corresponding to Fig. 4 and showing the operation of providing a plant stem receiving loop by a slightly modified form of the strip tag shown in Fig. 8;

Fig. 10 is a perspective view corresponding to Fig. 5, but showing the tag of Fig. 8 looped and locked about a plant stem or stalk which has grown to an extent to fill the loop of the tag and cause same to gradually loosen; and Fig. 11 is a plan view of a tag in accordance with a still further embodiment thereof and providing a larger supporting loop.

Referring now in detail to the drawing, 10 designates a preformed and printed sheet of flat, thin and resilient thermoplastic material and which while being of indeterminate length, is essentially of a width equal to the length of the self-locking and releasing tags which are formed complete by merely cutting same therefrom along parallel lines.

The sheet 10, as shown in Fig. 1, has been prepared for this successive parallel cutting of tags therefrom in accordance with the novel steps in the method of forming these self-locking and releasing tags, which consists in providing the sheet with a series of relatively large apertures 11, which are in equally spaced relation and whose centers are in a straight line adjacent to and parallel with one edge of the strip.

Furthermore, it is essential to the practicing of this method that the distances between the centers of adjacent apertures 11 be equal to the maximum width of the finally formed tags and that the diameter of each aperture 11 be equal to the minimum width of a tag strip.

In the method of preparing the sheet for the cutting of tags therefrom, the sheet is also treated in the provision of a series of slits 12 which extend radially from the apertures 11 at right angles to the adjacent edge of the strip and toward the opposite edge thereof. The lengths of the slits are such that same plus the diameters of the apertures is slightly greater than the maximum widths of the finally formed tags.

Proceeding further with the method of preparing the sheet 10 for the cutting of tags therefrom, the sheet is also provided with a series of relatively small apertures 13 which are disposed with their centers in a line parallel to the line of centers of apertures 11 but in substantial spaced relation thereto toward the opposite edge of the sheet.

In the provision of tags with minimum width portions, apertures 13 are formed in the sheet in staggered relation to the large tag body receiving apertures 11 for cutting through the centers thereof. As shown, the centers of adjacent apertures 13 are disposed in parallel lines normal to the sheet edges which bisect lines extending from center to center of adjacent apertures 11, as is indicated by the dot-and-dash line $x$ in Fig. 1. At this point it is to be observed that the sheet 10 may be provided with a gloss face or side surface 15 and an opposite rough or dull face 16, for a purpose later to appear.

With the sheet 10 prepared with the two or more series of apertures and slits as above described and as indicated in Figs. 1 and 6, the final step in the method of forming the tags consists in merely cutting the sheet 10 along parallel lines $x$ from one edge thereof to the other and which lines intersect the centers of the relatively small apertures 13 and bisect lines connecting the centers of the relatively large apertures 11.

The cutting operation provides tags 14 as shown in Figs. 3, 4, 5 and 6.

It is here to be pointed out that the gloss surface 15 provides for the protection of printed matter such as advertising, such for example the makers of the sheet material or tags and such advertising is here represented as an example by "John Doe Co." The rough or dull surface 16, however, is for the purpose of writing or printing thereon with pencil, pen or crayon the name of the plant to which the tag is to be attached, as for example "Red Azalea" in Fig. 3, and "Radiant" in Fig. 5.

In the cutting of the tags 14, from the sheet 10, the relatively large apertures 11 are adjacent one end thereof with their centers centrally of the opposite side edges of the strips forming the tags while the relatively small apertures 13 are bisected in the cutting operation thereby providing opposite side edge notches 13a in the tags, or portions of minimum width.

With the tags completely formed as in Fig. 3, the names of the particular plants to which they are to be attached, can readily be written on the rough or dull surface thereof and such surface admits of ready erasure of the name, even by a washing process.

In applying an improved strip tag 14, same is first looped about a plant stem, whereupon the end 17 of the tag is then inserted within the aperture 11 and the adjacent slit 12, at the opposite end 18 of the tag as is illustrated in Fig. 4. The end 18 is held in the fingers of one hand while the end 17 is drawn forwardly thereby diminishing the initially formed loop and in this action a substantial twist will be imparted to the strip, as is also clearly shown in Fig. 4. The end 17 is then pulled until the notches 13a reach the aperture 11 whereupon slight twist on the strip will result in this body portion of a width equal to the diameter of the aperture 11 assuming its natural position and width the notches automatically interlocked with the edge of aperture 11, at points in a diametter thereof, at right angles to the slit 11. A tag supporting loop 19 will thus be provided in encircling relation to the stalk or stem of a plant P (Fig. 5).

Due to the construction of the tags from thermoplastic material, same will not be damaged by weather elements or other natural care required as the plant grows and as pressure of the growing stem in the loop 19 increases, the tag will automatically back off and loosen or break by rupture of the side edge portions in a diameter of the aperture 11.

However, it is not proposed that the tags be broken and in use with garden plants they can be loosely applied at the start and breakage thereof avoided since the tags are adapted for use year after year.

In the modified form of tag 14', according to Fig. 6, a second pair of notches 13b is provided from a second series of small apertures 13, thereby providing for the formation of two different size plant receiving loop portions in severing each tag.

A further modified embodiment of the invention is shown in Figs. 7 to 10. Here the sheet 10a is shown similar to the sheet 10 of Fig. 1, and having the opposed rough erasable surface 16 and the gloss surface 15. Furthermore, the tags 14a are cut from this sheet 10a in the same manner as above described in connection with the sheet 10 of Fig. 1.

In this modified embodiment however, the relatively large apertures 11a communicate at one side with cut out slots 12a which are of a width to receive the bodies of the tags freely and without flexure of the material adjacent the slots. Further such slots provide for thicker material in the sheet from which the tags are cut.

Also in this modified embodiment, the relatively small apertures as shown at 13 in Fig. 1, are replaced by "tear drop" shaped apertures 13', whose pointed ends face toward the end of the sheet opposite to the end in which the apertures 11a are formed.

Thus upon cutting the sheet 10a on lines x, individual tags 14a (Fig. 8) are produced with each tag provided with laterally opposed elongated notches 13'' in its side edges, intermediate the ends 17 and 18 thereof. These elongated notches 13'', include an arcuate inner edge portion and a straight inclined outer edge portion, whereby when the loop 19' receiving the stem of a plant P' is filled by the growing stem, the inclined edges provide for slipping of the engaged parts so that more ready backing off of the end 18 of the tag is permitted.

As will be seen from Fig. 9 the relatively wide slot 12a provides for free passage of the end 17' of the tag strip body through the aperture 11a. This slot 12a has been found highly desirable when using a rather stiff or thickened material.

The advantage of the half "tear drop" notches will be more apparent from an inspection of Fig. 10, wherein the edge of aperture 11a is shown engaging the oppositely outwardly inclined edges of the notches permitting loosening and backing off of the looped portions as the stem fills and outgrows the loop 19'. In some instances if the tag is not then removed, it may eventually rupture at opposite sides of the aperture 11a.

The tags 14a are preferably formed with square ends 17 in order to expedite manufacture thereof but same may be cut with a more ornamental end 17' according to the further modified embodiment of Fig. 11 and which form of end is also shown in Fig. 9.

As shown in Fig. 11 the notches 13'' may be formed in the modified tag 14b, nearer the end 17', whereby to provide a substantially large stem encircling loop 19'.

Having described the improved tags and method in a preferred embodiment thereof, what I claim and desire to secure by U. S. Letters Patent is:

1. A plant identification tag comprising a relatively thin resilient strip of uniform width having parallel edges, a relatively large aperture in said strip adjacent one end thereof having its center intermediate said edges, a slit in the strip extending radially from the aperture parallel to and intermediate said edges and toward the opposite end of the strip, the diameter of said aperture and length of said slit being of a combined dimension equal to at least the width of said strip, for initially receiving the other end of the strip when flexed to a position at right angles to said first end of the strip, a pair of transversely aligned notches in the said edges of the strip intermediate said aperture and the other end of the strip, the distance between the bases of said notches being substantially equal to said diameter of the aperture for permitting return of the strip from said right angular flexed position and wherein the portion of the strip intermediate the bases of said notches extends diametrically of said aperture and at right angles to said slit in the provision of a plant encircling loop.

2. A tag forming blank comprising a rectangular sheet of flexible material, said sheet being provided with a row of apertures whose centers are equally spaced in a line extending across the sheet adjacent an edge thereof, said sheet being provided with a slit disposed diametrically of and opening into each aperture and extending at right angles to said line, and said sheet being provided with a second row of apertures whose centers are in a line parallel with and in substantial spaced relation to said first line, and said centers of said second row of apertures being in lines parallel with and intermediate said slits and the centers of said first row of apertures, whereby upon cutting said blank along said last lines, individual tags are provided, each comprising an elongated strip having an aperture and cooperating slit adjacent one end thereof for receiving the opposite end thereof, together with laterally opposed notches for locking engagement with the strip at the margin of the aperture therein.

JOHN LANGDON WATTS.

References Cited in the file of this patent

UNITED STATES PATENTS

| Number | Name | Date |
| --- | --- | --- |
| 659,199 | Anderton | Oct. 9, 1900 |
| 1,001,209 | Miller | Aug. 22, 1911 |
| 1,810,027 | Moran | June 16, 1931 |
| 2,063,553 | Mooney | Dec. 8, 1936 |
| 2,192,514 | Carleton | Mar. 5, 1940 |
| 2,423,818 | Schmutzler | July 8, 1947 |
| 2,554,105 | Heinle | May 22, 1951 |
| 2,556,825 | Smith | June 12, 1951 |
| 2,578,548 | Histed | Dec. 11, 1951 |

FOREIGN PATENTS

| Number | Country | Date |
| --- | --- | --- |
| 171,737 | Switzerland | Mar. 1, 1935 |
| 398,599 | Great Britain | Sept. 21, 1933 |